May 31, 1955
J. T. BARRON
2,709,373
ADJUSTABLE DIAMETER SHEAVES
Filed Sept. 10, 1952
3 Sheets-Sheet 2
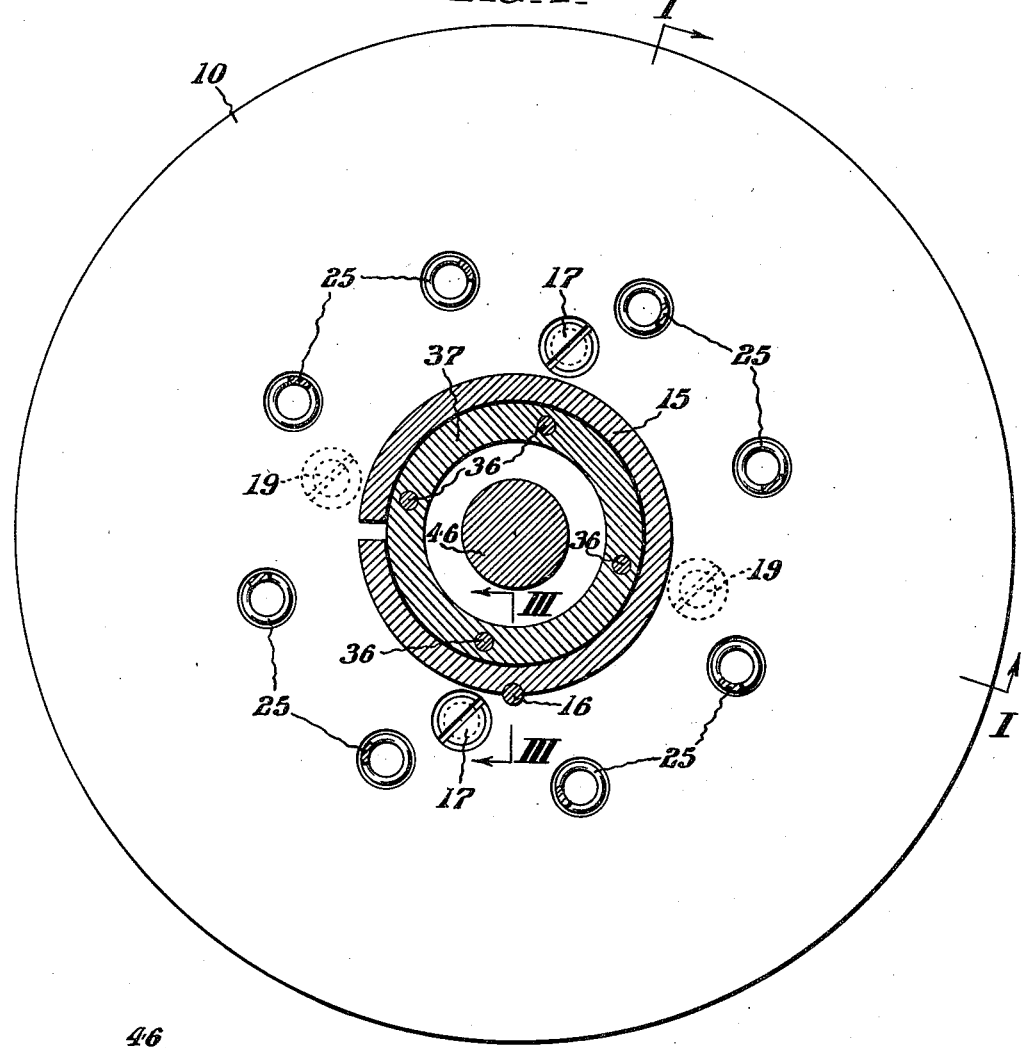
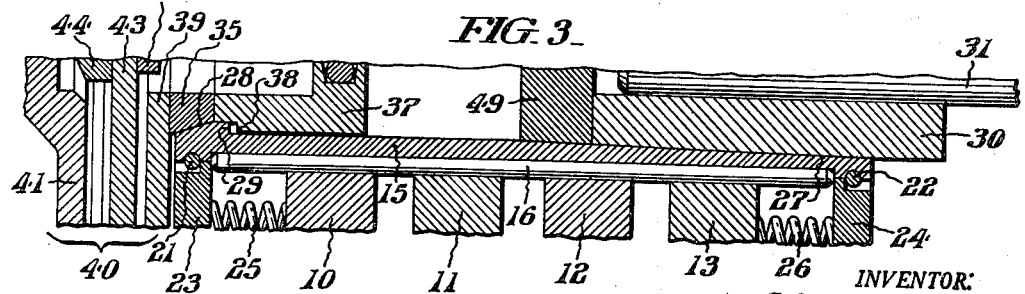
INVENTOR:
John T. Barron,
BY Paul & Paul
ATTORNEYS.

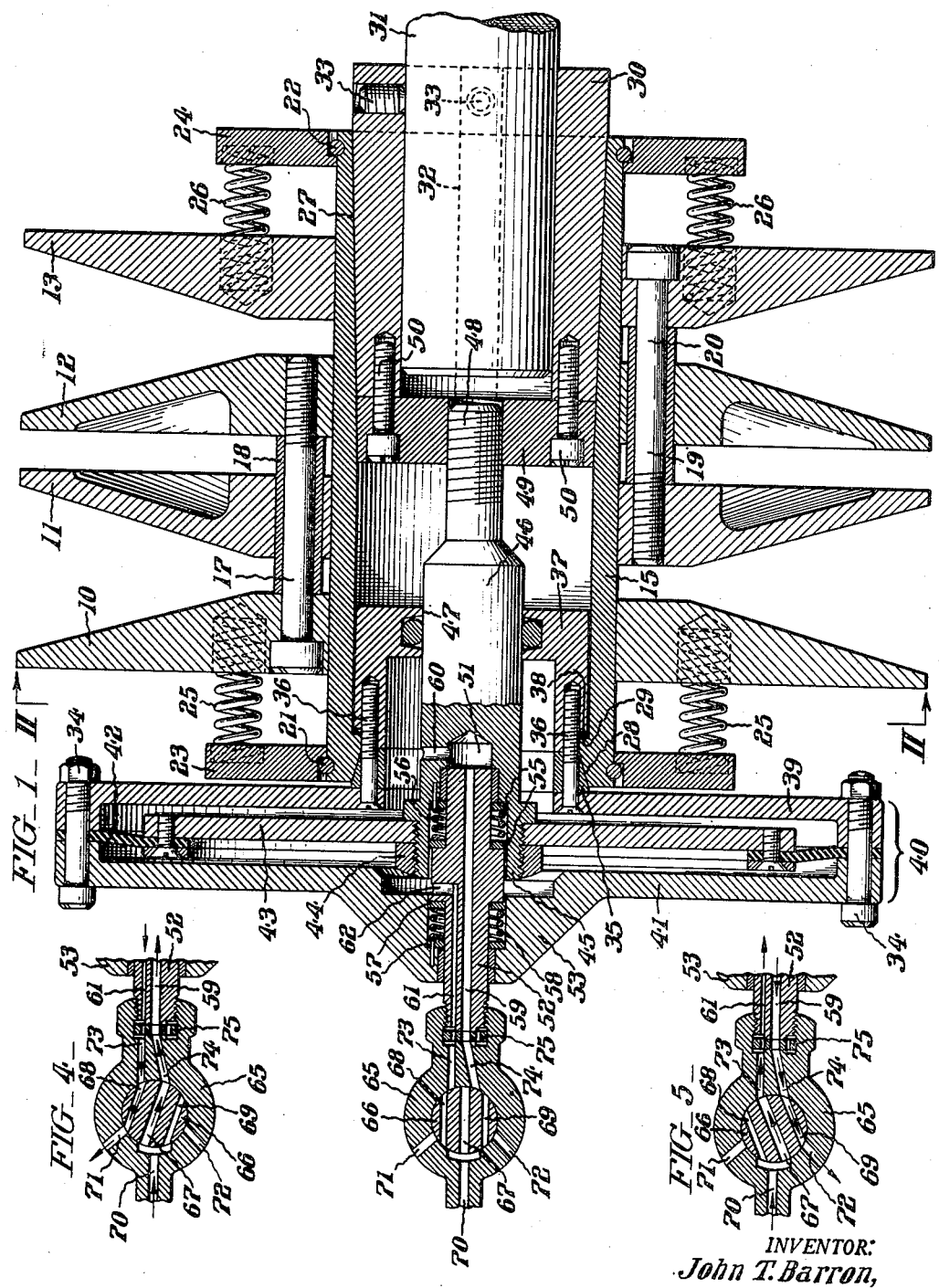
INVENTOR:
John T. Barron,
BY
ATTORNEYS.

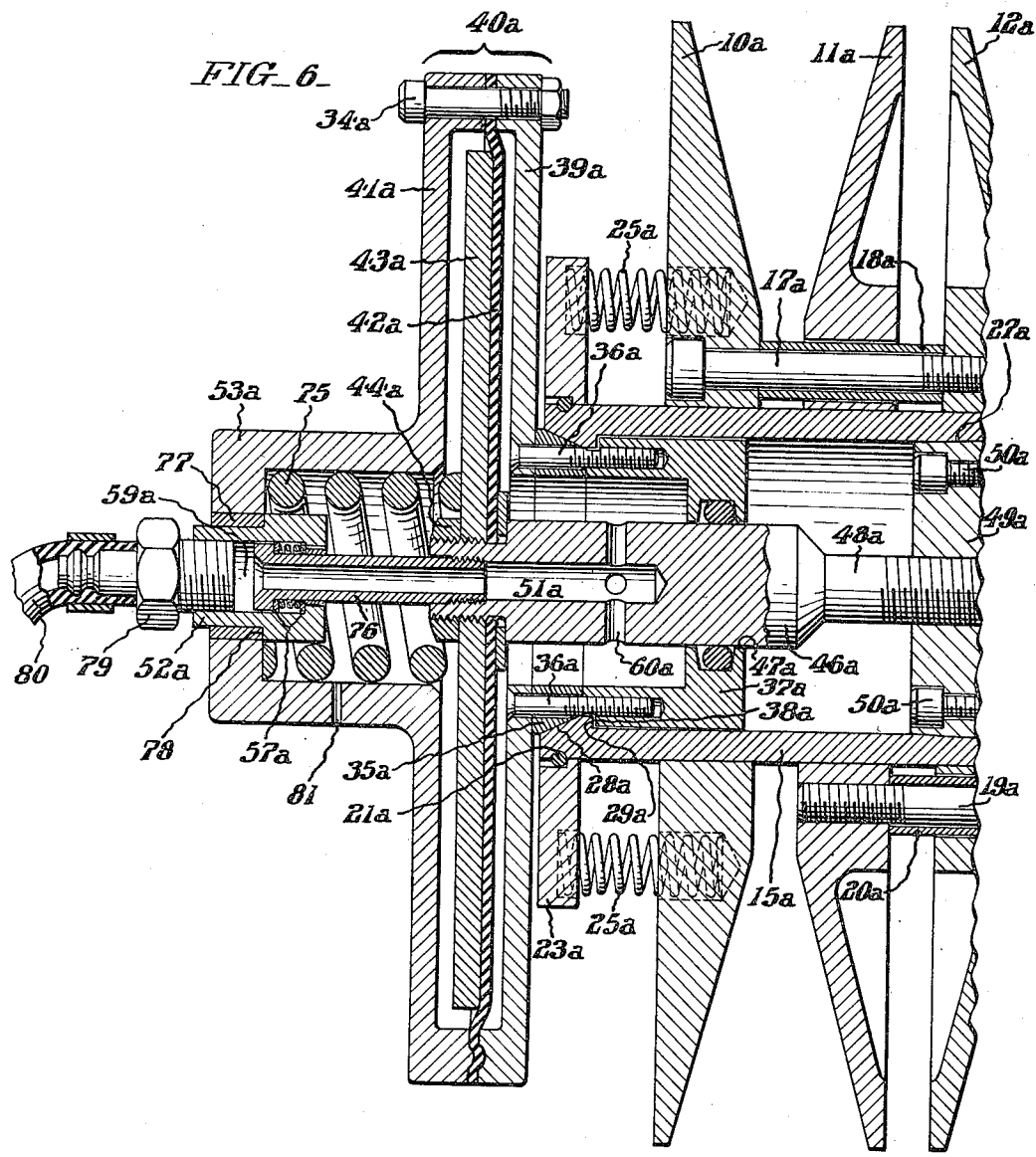

United States Patent Office 2,709,373
Patented May 31, 1955

2,709,373

ADJUSTABLE DIAMETER SHEAVES

John T. Barron, Elkins Park, Pa., assignor to The American Pulley Company, Philadelphia, Pa., a corporation of Pennsylvania Application September 10, 1952, Serial No. 308,729

7 Claims. (Cl. 74—230.17)

This invention relates to V belt sheaves such as disclosed in copending application Serial No. 308,777, filed by William A. Williams on September 10, 1952, wherein oppositely-beveled flange disks are mounted upon a split hub sleeve, with capacity for being axially shifted by yielding means relative to each other when released as the belt is tightened or slackened for variation in the effective diameter of the sheave; and wherein the hub sleeve is normally circumferentially expanded to hold disks fixed in position after adjustment, by wedge elements engaged into opposite ends of said sleeve. Moreover, in the Williams construction, the wedgedly-interengaging parts are normally held in flange disk locking relation by spring means; and mechanical means as well as pressure fluid motor means are disclosed whereby, when the effective diameter of the sheave is to be changed, one of the wedge elements is axially retracted relative to the hub sleeve and the hub sleeve relative to the other wedge element against the pressure of the spring means to allow said sleeve to contract circumferentially for release of the flange disks.

The chief aim of my invention is to make it possible to dispense with the spring means above referred to, and to enable the use of a double acting pressure fluid motor as a means for moving the wedge elements and the hub sleeve relatively to release the flange disks for adjustment, and to hold the disks set against shifting after adjustment.

How the foregoing and other important objectives and attendant advantages are realized in practice will appear from the following detailed description of the attached drawings wherein:

Fig. 1 is a longitudinal sectional view of a double groove wedge belt sheave conveniently embodying my invention, the section being taken as indicated by the angled arrows I—I in Fig. 2.

Fig. 2 is a cross section taken as indicated by the angled arrows II—II in Fig. 1.

Fig. 3 is a fragmentary view in section taken as indicated by the angled arrows III—III in Fig. 2.

Figs. 4 and 5 are detail sectional views of a valve by which the sheave of Figs. 1 and 2 is controlled; and Fig. 6 is a view like Fig. 1 showing a modified embodiment of my invention.

As herein exemplified, the sheave has two pairs of opposingly-beveled flanges in the form of disks 10, 11 and 12, 13 which are axially slidable upon the outer cylindric surface of a longitudinally-split hub sleeve 15 but restrained against rotation by the key shown at 16 in Figs. 2 and 3. In order to be shiftable together, the disks 10 and 12 are connected by screws 17 which are diametrically arranged, as will be seen in Fig. 2, with interposition of spacers 18 that pass freely through the disk 11. The disks 11 and 13 are similarly connected by screws 19 arranged on a diameter at right angles to the screws 17 with interposition of spacers 20 that pass freely through disk 12.

Mounted upon opposite ends of hub sleeve 15 and held thereto by split stop rings 21 and 22, are collars 23 and 24 respectively; and interposed in compression, between said collars and the flange disks 10 and 13, are annularly-arranged springs 25 and 26 respectively. Upon circumferential contraction of hub sleeve 15 as later explained, the springs 25 and 26 tend to cause the disks 10, 11 and 12, 13 to move axially toward each other to increase the effective diameter of the pulley if the belt used with the pulley is slacked. Upon tightening the belt or increasing the tension thereon, the springs 25 and 26 yield to permit the disks to separate.

The bore of hub sleeve 15 is tapered at opposite ends as at 27 and 28, the taper 27 being comparatively long and gentle, and the taper 28 being shorter and more abrupt and terminating in an annular shoulder 29 within the sleeve. Engaging partway into the long tapered bore end 27 of hub sleeve 15 is a correspondingly tapered wedge element 30 in the form of a bushing which is keyed to a rotary shaft 31 as at 32, and secured by set screws 33; and engaging into the short taper bore end 28 of hub sleeve 15 is a correspondingly short annular wedge element 35. By means of a plurality of annularly-arranged screws 36, the wedge element 35 is clampingly secured between a hollow piston-like element 37 disposed within the cylindric mid portion of the bore of hub sleeve 15 and one side wall component 39 of the casing of a double-acting pressure fluid motor 40, said piston-like element having a circumferential shoulder 38 which normally clears the internal shoulder 29 of the wedge element as shown. Being affixed by the screws 36, piston-like element 37 may be considered as a part of wedge element 35. The other side wall component 41 of motor 40 is secured to the side wall component 39 by bolts 34, and clamped medially between said wall components is a flexible diaphragm 42 whereto is affixed a plate 43. As far as described up to this point, the construction here is generally like that disclosed in Fig. 8 of the Williams application, supra.

Screw engaged into a tapped axial aperture in diaphragm plate 43 and secured by a clamp nut 44, in accordance with my invention, is the shouldered and threaded diametrically-enlarged end 45 of a rod extension 46. As shown, the rod extension 46 passes through a gasket-sealed axial opening 47 in the closed end of piston-like element 37, and its opposite end is diametrically reduced and threaded, as at 48, to engage into a tapped aperture in a head 49 secured to the inner end of bushing 30 by screws 50. Thus rod 46 may be regarded as an axial prolongation of wedge bushing 30, by which the latter is connected to the diaphragm 42 of motor 40. At its larger end, rod 46 has an axial bore 51 whereinto engages, part way, the inner end of a non-rotating stub shaft 52 which extends outwardly through an axial bearing boss 53 on wall component 41 of motor 40. Packing rings 55 held by a spring 56 against internal and external shoulders respectively of the rod 46 and the shaft 52, serve to prevent fluid leakage at the region of inter-engagement of the latter parts. Similar packing rings 57, subject to a compression spring 58, similarly prevent fluid leakage around shaft 52 through bearing 53. Shaft 52 has a through axial duct 59 which, at its inner end, communicates by way of a radial port 60 in rod 46, with the interior of the piston-like element 37, and, in turn, with the interior of the casing of motor 40 to the right of diaphragm 42. Shaft 52 also has an eccentrically-disposed longitudinal duct 61 which, by way of another radial port 62 in rod 46, communicates with the hollow of the motor casing to the left of diaphragm 42. Screw connected into the protruding end of stub shaft 52 is a control valve 65 whereof the rotatable plug 66 has a central diametral port 67, and two additional through ports 68 and 69 equally spaced from said port 67 in parallel relation thereto. In addition to a main port 70 through which compressed air or other motive fluid is introduced from a suitable source of supply (not illustrated), the body of valve 65 has two radial exhaust posts 71 and 72 which are uniformly spaced angularly from port 70 and opposite the latter port, and two spaced ports 73 and 74 respectively in registry with the ducts 59 and 61 in shaft 52. The packing ring shown at 75 is relied upon to prevent fluid leakage at the region of connection between the valve 65 and the shaft 52.

Operation

In Fig. 1, it is to be understood that compressed air has been admitted into and is being retained in casing of motor 40 at the right of diaphragm 42. As a consequence, the taper 28 of wedge element 35 is maintained in wedging engagement with the short tapered bore end of hub sleeve 15, and the long taper bore end of said sleeve in engagement with the taper of bushing 30. Under these conditions, hub sleeve 15 is circumferentially expanded within the flange disks 10, 12, and 11, 13 and said disks thereby clamped against axial shifting relatively under the influence of springs 25 and 26. When the effective diameter of the sheave is to be changed, control valve 65 is turned to the position in which it is shown in Fig. 5, with the result that compressed air is admitted, by way of the duct 61 and port 62 in stub shaft 52 and the port 60 in rod 46, into the space within the casing of motor 40 to the left of diaphragm 42, while at the same time, the space to the right side of said diaphragm is evacuated by way of the port 60 in rod 49, the axial duct 59 in stub shaft 52, and ports 74, 69 and 72 of said valve. As a result, motor 40 is bodily moved leftward incident to which the wedge element 35 is first retracted until the shoulder 38 of piston-like element 37 engages the internal shoulder 29 of split sleeve 15, the latter being thereby carried along for a short distance and relieved from the taper of bushing 30. Sleeve 15 is accordingly freed to contract circumferentially and releases the flange disks 10, 12 and 11, 13 which will be shifted closer together by action of the springs 25 and 26, or be separated by a greater distance against the pressure of said springs, depending upon whether the tension on the belt is increased or decreased. After the desired setting of the flange disks is attained, valve 65 is turned to the position in which it is shown in Fig. 4, when pressure fluid will be admitted into the space within motor 40 to the right of diaphragm 42 by way of the ports 67, 74 of said valve, axial duct of stub shaft 52 and port 60 in rod 46, while at the same time the space within the motor casing to the left of diaphragm 42 will be evacuated by way of the port 62 and duct 61 in said stub shaft, and ports 73, 68 and 71 in said valve. Under these conditions, the casing of motor 40 will be bodily moved to the right in Fig. 1 whereby the wedge element 35 is first brought into engagement with the tapered bore end of hub sleeve 15 and said sleeve thereafter moved to the right relative to bushing 30, with consequent enforced circumferential expansion of said sleeve to re-clamp the flange disks in the new relative positions.

Modified embodiment

In the alternate embodiment of my invention illustrated in Fig. 6, the axial boss 53a on the wall component 41a of the casing of motor 40a is made hollow for occupation by a heavy spiral compression spring 75 which bears upon the diaphragm plate 43a from the left, and a tube 76 forms a continuation of the axial bore of rod 46a. The non-rotating stub shaft 52a is here quite short and has a diametrically reduced portion which extends outward through a bearing 77 set into the end of boss 53a, with its shoulder 78 abutting the inner end of said bearing. Screwed into the protruding end of the shaft 52a is a nipple 79 for connection of a hose 80 leading from a supply source (not shown) of pressure fluid. Tube 76 extends into the bore or axial duct 59a of stub shaft 52a, and leakage at this juncture is prevented by spring-backed sealing gaskets 57a. Flow and exhaust of pressure fluid to and from motor 40a is controlled, it is to be understood, by a suitable valve (not illustrated) interposed in tube 80. The space within motor 40 to the left side of diaphragm 42a is always open to the atmosphere by way of a radial relief port 81 in the boss 53a of the motor casing. All other elements in the modified embodiment, not particularly referred to but having their counterparts in the first described embodiment, are identified by the same reference numerals previously used with addition, in each instance, of the letter "a," for convenience of more ready distinction.

Operation of modified embodiment

Normally, by the force of the pressure fluid supplied through the nipple 79 and maintained in the motor 40a, the wedge element 35a and the head 49a will be held in the relative positions in which they are shown to keep the pulley flanges 10a and 11a fixed against displacement. However, upon exhausting of the pressure fluid from the motor 40a, spring 75 will cause the casing of the motor to be bodily shifted leftward relative to diaphragm disk 43a. As a consequence, the wedge element 35a will be withdrawn from the tapered end bore of sleeve 15a, with eventual retraction of the latter in the same direction as the shoulder 38a on element 37a engages the internal shoulder 29a of said sleeve, to release flange disks 10a and 11a for adjustment in the same manner as described hereinbefore in connection with the first embodiment.

Having thus described my invention, I claim:

1. In an adjustable sheave, a split hub sleeve having its bore tapered inwardly from opposite ends; at least one pair of opposingly-beveled annular sheave flanges mounted upon and slidingly keyed to the hub sleeve; yielding means tending to shift the flanges relative to each other along the sleeve; wedge elements for engaging into opposite ends of the bore of the sleeve; a diaphragm motor having a casing, said casing being secured to one of the wedge elements and its diaphragm connected to the other wedge element; and manually-controllable valve means for selectively admitting pressure fluid into the motor casing to opposite sides of the diaphragm to cause one wedge element to be moved axially toward the other wedge element to circumferentially expand the sleeve and thereby clamp the flanges in set positions, or to be moved axially away from said other wedge element and thereby permit contraction of the sleeve circumferentially for release of the flanges.

2. An adjustable sheave according to claim 1, wherein the wedge element to which the motor casing is secured is annular; and wherein the other wedge element has an axial prolongation at its inner end which extends, with fluid tightness, through the first mentioned wedge element and to which the diaphragm of the motor is secured.

3. An adjustable sheave according to claim 1, wherein a non-rotating shaft extends, with fluid tightness, through a wall of the motor casing and axially through the diaphragm; wherein said shaft has longitudinal ducts with communicating ports open into the motor casing respectively at opposite sides of the diaphragm; and wherein the control valve is of the rotary plug type and connected to the protruding end of the shaft, and has ports in its plug arranged so that when the latter is turned to one position pressure fluid is admitted by way of one of the ducts and the other duct is opened to the atmosphere, and vice versa when the plug is turned to another position.

4. In an adjustable sheave, a longitudinally split hub sleeve having its bore tapered inwardly from opposite ends, one of the tapers terminating in a circumferential shoulder internally of the sleeve; at least one pair of opposingly-beveled sheave flanges mounted on the hub sleeve; yielding means tending to shift the sheave flanges relative to each other along the sleeve; tapered wedge elements for engaging into the tapered bore ends of the sleeve to expand the latter circumferentially expanded with the flanges set against relative displacement, one of said elements having a circumferential shoulder spaced from the internal shoulder of the sleeve; a diaphragm motor secured to the external end of shouldered wedge element; an axial rod extension on the other wedge element extending, with fluid tightness, through the shouldered wedge element and connected to the diaphragm of the motor; and a passage in said rod extension through which pressure fluid may be admitted to the motor for action upon the diaphragm of the latter to cause the two wedge elements to be moved axially toward each other and thereby expand the sleeve circumferentially to hold the sheave flanges against relative displacement in adjusted positions during rotation of the sheave.

5. An adjustable sheave according to claim 4, in which a non-rotating tubular stub shaft extends axially inward through a wall of the motor and whereof the hollow is in communication with the passage in the rod extension aforesaid; and further including a nipple at the external end of the stub shaft for connection of a hose through which the pressure fluid is conducted.

6. In an adjustable sheave, a longitudinally split hub sleeve having its bore tapered inwardly from opposite ends, one of the tapers terminating in a circumferential shoulder internally of the sleeve; at least one pair of opposingly-bevelled sheave flanges mounted on the hub sleeve; yielding means tending to shift the sheave flanges relative to each other along the sleeve; tapered wedge elements for respectively engaging the tapered bore ends of the hub sleeve, one of said elements having a circumferential shoulder normally spaced from the internal shoulder of the sleeve; a diaphragm motor having a casing, said casing being secured to the external end of the shouldered wedge element; an axial rod extension on the other wedge element passing, with fluid tightness, through the shouldered wedge element into the casing of the motor and connected to the diaphragm; a non-rotating stub shaft extending into the casing and having a fluid-tight axial connection with said rod extension; a passage extending axially through the stub shaft and part way through the rod extension and terminating in a radial port, for communication with the interior of the motor casing to one side of the diaphragm, by way of which passage pressure fluid is admitted to cause the two wedge elements to be moved axially toward each other and thereby expand the sleeve circumferentially to hold the sheave flanges against relative displacement in adjusted positions during rotation of the sheave; and spring means pressing against the opposite side of the diaphragm operative upon exhausting of the pressure fluid to the wedge elements axially away from each other to permit circumferential retraction of the sleeve for release of the sheave flanges when adjustment of the sheave is desired.

7. In an adjustable sheave, a split hub sleeve having its bore tapered inwardly from opposite ends; at least one pair of opposingly beveled annular sheave flanges mounted upon and slidingly keyed to the hub sleeve; yielding means tending to shift the flanges relative to each other along the sleeve; wedge elements for engaging respectively into the tapered opposite ends of the sleeve bore; a diaphragm motor having a casing, said casing being secured to the outer end of one of the wedge elements; selective means for admitting and exhausting pressure fluid into and from the motor to opposite sides of the diaphragm; and means connecting the diaphragm of the motor to the other wedge element whereby, upon admission of pressure fluid into the motor to one side of the diaphragm, the wedge elements are moved axially relative to each other into wedging position for maintenance of the sleeve in expanded condition to prevent relative shifting of the flanges along the sleeve by said yielding means; and whereby, upon admission of pressure fluid into the motor to the other side of the diaphragm, the wedge elements are reversely moved to permit the sleeve to contact circumferentially and release the flanges.

References Cited in the file of this patent

UNITED STATES PATENTS

| 2,495,078 | Schweickart | Jan. 17, 1950 |
| 2,610,515 | Williams | Sept. 16, 1952 |